United States Patent
Ogita

(10) Patent No.: US 11,296,958 B2
(45) Date of Patent: Apr. 5, 2022

(54) PACKET CAPTURE DEVICE AND PACKET CAPTURE METHOD

(71) Applicant: TOYO Corporation, Tokyo (JP)

(72) Inventor: Keiichi Ogita, Tokyo (JP)

(73) Assignee: TOYO CORPORATION, Tokyo (JP)

( * ) Notice: Subject to any disclaimer, the term of this patent is extended or adjusted under 35 U.S.C. 154(b) by 0 days.

(21) Appl. No.: 17/430,866

(22) PCT Filed: Apr. 24, 2020

(86) PCT No.: PCT/JP2020/017856
§ 371 (c)(1),
(2) Date: Aug. 13, 2021

(87) PCT Pub. No.: WO2021/215011
PCT Pub. Date: Oct. 28, 2021

(65) Prior Publication Data
US 2022/0045918 A1 Feb. 10, 2022

(51) Int. Cl.
*H04L 12/26* (2006.01)
*H04L 43/022* (2022.01)
*H04L 43/04* (2022.01)

(52) U.S. Cl.
CPC ............ *H04L 43/022* (2013.01); *H04L 43/04* (2013.01)

(58) Field of Classification Search
CPC ..... H04L 43/02; H04L 43/022; H04L 43/026; H04L 43/028; H04L 43/08;
(Continued)

(56) References Cited

U.S. PATENT DOCUMENTS 5,887,146 A * 3/1999 Baxter ................ G06F 11/2289
710/104
6,418,517 B1 * 7/2002 McKenney ........... G06F 9/4825
707/999.104
(Continued)

FOREIGN PATENT DOCUMENTS

JP 9-54658 2/1997
JP 2010-124382 6/2010
(Continued)

OTHER PUBLICATIONS

International Search Report (ISR) dated Jun. 9, 2020 in International (PCT) Application No. PCT/JP2020/017856.
(Continued)

*Primary Examiner* — Kevin D Mew
(74) *Attorney, Agent, or Firm* — Wenderoth, Lind & Ponack, L.L.P.

(57) ABSTRACT

A packet capture device incudes: a capture unit which captures packets that flow in a communication network at 200 Gbps; a control unit which temporarily holds the packets captured; and an interface which stores the packets temporarily held into a secondary storage device. The control unit includes: a first NUMA node including a first processor and a first memory; and a second NUMA node including a second processor and a second memory. The capture unit includes: a first capture unit which captures packets and stores the packets into a first memory; and a second capture unit which captures packets and stores the packets into a second memory.

5 Claims, 9 Drawing Sheets

(58) Field of Classification Search
CPC ............. H04L 43/0876; H04L 43/0882; H04L 43/0894; H04L 47/10; H04L 47/24; H04L 47/2408; H04L 47/2441; H04L 43/04
See application file for complete search history.

(56) References Cited

U.S. PATENT DOCUMENTS

| | | | |
|---|---|---|---|
| 9,648,102 B1* | 5/2017 | Davis | H04L 67/1097 |
| 9,684,597 B1* | 6/2017 | Eiriksson | G06F 12/0815 |
| 10,423,358 B1* | 9/2019 | Foo | G06F 3/0656 |
| 2007/0058632 A1* | 3/2007 | Back | H04L 43/00 370/392 |
| 2007/0061433 A1* | 3/2007 | Reynolds | H04L 47/20 709/223 |
| 2009/0199201 A1* | 8/2009 | Arimilli | G06F 9/546 718/106 |
| 2014/0173338 A1* | 6/2014 | Arroyo | G06F 11/1438 714/15 |
| 2014/0359044 A1* | 12/2014 | Davis | G06F 9/5016 709/213 |
| 2015/0262632 A1* | 9/2015 | Shelton | G06F 12/0246 711/103 |
| 2017/0359264 A1 | 12/2017 | Bird et al. | |
| 2018/0307520 A1 | 10/2018 | Hyoudou | |
| 2019/0020601 A1 | 1/2019 | Liu | |
| 2019/0297013 A1 | 9/2019 | Xin et al. | |
| 2019/0354318 A1 | 11/2019 | Foo | |
| 2019/0369907 A1 | 12/2019 | Saitoh et al. | |
| 2020/0089434 A1* | 3/2020 | Foo | G06F 3/0604 |
| 2020/0159449 A1* | 5/2020 | Davis | G06F 3/0658 |

FOREIGN PATENT DOCUMENTS

| | | |
|---|---|---|
| JP | 2018-185624 | 11/2018 |
| JP | 2019-500821 | 1/2019 |
| JP | 2019-521581 | 7/2019 |
| JP | 2019-536383 | 12/2019 |
| WO | 2017/114447 | 7/2017 |
| WO | 2017/212461 | 12/2017 |
| WO | 2018/099394 | 6/2018 |
| WO | 2019/111303 | 6/2019 |

OTHER PUBLICATIONS

Paul, M.V.V. et al., "Traffic Capture beyond 10Gbps: Linear Scaling with Multiple Network Interface Cards on Commodity Servers," Proceedings of the 2014 International Conference on Data Science & Engineering (ICDSE), Dec. 2014, pp. 194-199 V-Vi, Fig 1, 4-5.
International Preliminary Report on Patentability Chapter II (IPRP2) dated Mar. 9, 2020 in International (PCT) Application No. PCT/JP2020/017856, with English translation.

* cited by examiner

PACKET CAPTURE DEVICE AND PACKET CAPTURE METHOD

TECHNICAL FIELD

The present invention relates to a packet capture device and a packet capture method for capturing packets that flow in a communication network and storing the captured packets into a secondary storage device.

BACKGROUND ART

There are needs for a packet capture device capable of capturing all packets that flow in a communication network for a long period of time, in preparation for response to communication errors in the communication network such as Ethernet (registered trademark). In view of this, it is desired to store generated packets into a secondary storage device at high speed without dropping any of the packets.

Conventionally, a method for data writing using a parallel secondary storage device configured to include a plurality of secondary storage devices has been proposed as a technique for storing data into the secondary storage device at high speed (for example, see Patent Literature (PTL) 1). In PTL 1, a secondary storage device is configured as a plurality of secondary storage devices, and data is stored into one of the plurality of secondary storage devices which performs processing with a smallest load amount in response to a write request. In this way, the technique in PTL 1 accelerates data input to and output from the parallel secondary storage device without producing deviation in access load amount.

CITATION LIST

Patent Literature

[PTL 1] Japanese Unexamined Patent Application Publication No. H9-54658

SUMMARY OF INVENTION

Technical Problem

However, with the technique in PTL 1, it is difficult to sequentially capture all packets that flow in a communication network at an extremely high speed of 200 Gbps without dropping any of the packets, and store the packets into a secondary storage device.

In view of this, the present invention has an object of providing a packet capture device and a packet capture method for sequentially capturing all packets that flow in a communication network at a speed of 200 Gbps without dropping any of the packets, and storing the packets into a secondary storage device.

Solution to Problem

In order to achieve the above object, a packet capture device according to an aspect of the present invention is: a packet capture device which captures packets that flow in a communication network and stores the packets captured into a secondary storage device, and which includes: a capture unit which sequentially captures packets that flow in the communication network at 200 Gbps without dropping any of the packets; a control unit which temporarily holds the packets captured by the capture unit; and an interface which stores the packets temporarily held in the control unit into the secondary storage device, wherein the control unit includes two Non-Uniform Memory Access (NUMA) nodes included in a NUMA architecture, the two NUMA nodes being a first NUMA node including a first processor and a first memory and a second NUMA node including the second processor and a second memory, the capture unit includes: a first capture unit which is connected to the first NUMA node, captures packets that flow in the communication network, and stores the packets captured into the first memory; and a second capture unit which is connected to the second NUMA node, captures packets that flow in the communication network in parallel with the capturing by the first capture unit, and stores the packets captured into the second memory, and the interface includes: a first interface which is connected to the first NUMA node, and stores the packets stored in the first memory into the secondary storage device; and a second interface which is connected to the second NUMA node, and stores the packets stored in the second memory into the secondary storage device in parallel with the storing by the first interface.

Furthermore, in order to achieve the above object, a packet capture method according to an aspect of the present invention is: a packet capture method which is for capturing packets that flow in a communication network and storing the packets captured into a secondary storage device, and which includes: a capture step of sequentially capturing packets that flow in the communication network at 200 Gbps without dropping any of the packets; and a store step of storing the packets captured in the capture step into the secondary storage device, wherein the capture step includes: a first capture step of capturing packets that flow in the communication network, and storing the packets captured into a first memory included in a first Non-Uniform Memory Access (NUMA) node included in a NUMA architecture; and a second capture step of capturing the packets that flow in the communication network in parallel with the capturing in the first capture step, and storing the packets captured into a second memory included in a second NUMA node included in the NUMA architecture, and the store step includes: a first store step of storing the packets stored in the first memory into the secondary storage device; and a second store step of storing the packets stored in the second memory into the secondary storage device in parallel with the storing in the first storing step.

Advantageous Effects of Invention

The present invention provides a packet capture device and a packet capture method for sequentially capturing all packets that flow in a communication network at 200 Gbps without dropping any of the packets, and storing the packets into a secondary storage device.

DESCRIPTION OF AN EMBODIMENT

Hereinafter, an embodiment of the present invention is described in detail with reference to the drawings. It is to be noted that the embodiment described below indicates a specific example of the present invention. The numerical values, shapes, manufacturing companies, models, constituent elements, the arrangement and connection of the constituent elements, steps, the order of the steps, etc. are mere examples, and therefore do not limit the scope of the present invention. In addition, each of the drawings is not always illustrated precisely. In each of the drawings, substantially the same elements are assigned with the same reference signs, and overlapping descriptions are omitted or simplified.

Figure 1:
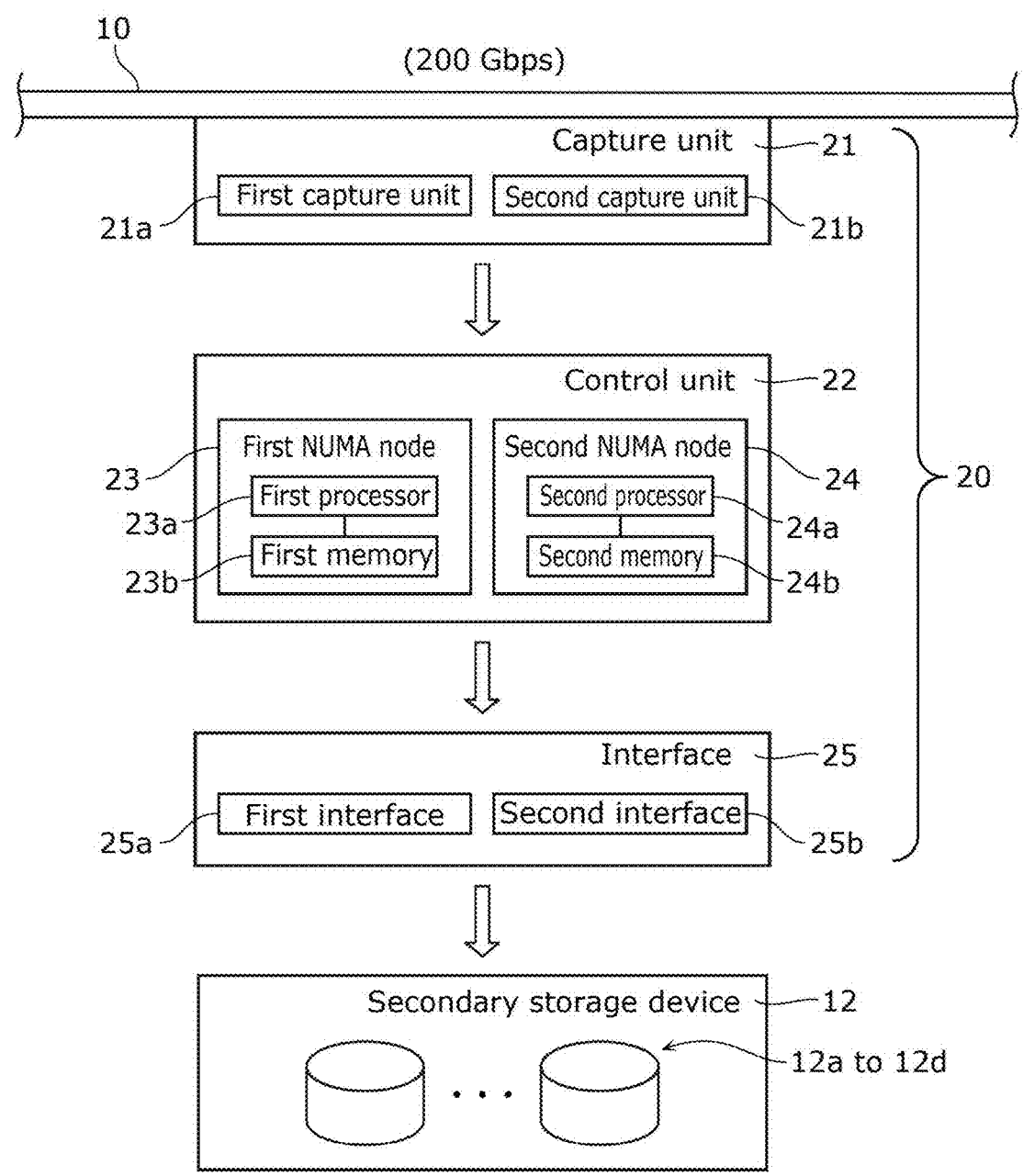
FIG. 1 is a block diagram illustrating a configuration of a packet capture device according to an embodiment.

FIG. 1 is a block diagram illustrating a configuration of packet capture device 20 according to an embodiment. It is to be noted that this diagram also illustrates communication network 10 that is a packet capture target, and secondary storage device 12 that is a storage destination of captured packets.

Packet capture device 20 is a device which captures packets that flow in communication network 10 and stores the packets into secondary storage device 12. Packet capture device 20 includes: capture unit 21 which sequentially captures packets that flow in communication network 10 at 200 Gbps without dropping any of the packets; control unit 22 which temporarily holds the packets captured by capture unit 21; and interface 25 which stores the packets temporarily held in control unit 22 into secondary storage device 12.

Control unit 22 includes two NUMA nodes which make up a Non-Uniform Memory Access (NUMA) architecture. The two NUMA nodes are first NUMA node 23 and second NUMA node 24 which operate in parallel. First NUMA node 23 includes first processor 23a and first memory 23b. Second NUMA node 24 includes second processor 24a and second memory 24b.

It is to be noted that a NUMA architecture is one of architectures of memory-shared multi-processor computer systems. The NUMA architecture is an architecture in which pairs of a processor and a memory (hereinafter, each pair is referred to as a node) are connected by interconnect. In the NUMA architecture, access to a memory in the same node (also referred to as a local memory) when seen from a processor requires low latency, and access to a memory in a different node (also referred to as a remote memory) when seen from the processor requires high latency. For reference, it is to be noted that a Uniform Memory Access (UMA) architecture different from the NUMA architecture is one of architectures of memory-shared multi-processor computer systems. The UMA architecture is an architecture in which processors share a bus, and all the processors are capable of accessing a memory in the same period of time. This embodiment uses the NUMA architecture characterized in that access to the local memory in the multi-processor requires low latency.

Capture unit 21 includes first capture unit 21a and second capture unit 21b which operate in parallel. First capture unit 21a is connected to first NUMA node 23, captures packets that flow in communication network 10, and stores the captured packets into first memory 23b. In other words, first memory 23b functions as a buffer memory for the packets captured by first capture unit 21a. Second capture unit 21b is connected to second NUMA node 24, captures packets that flow in communication network 10 in parallel with the capturing by first capture unit 21a, and stores the captured packets into second memory 24b. In other words, second memory 24b functions as a buffer memory for the packets captured by second capture unit 21b.

Interface unit 25 includes first interface 25a and second interface 25b which operate in parallel. First interface 25a is connected to first NUMA node 23, and stores the packets stored in first memory 23b into secondary storage device 12. Second interface 25b is connected to second NUMA node 24, and stores the packets stored in second memory 24b into secondary storage device 12 in parallel with the storing by first interface 25a.

Secondary storage device 12 is a non-volatile storage device (storage) for holding packets, and is a group of secondary storage devices 12a to 12d which are configured as, for example, Solid State Drives (SSDs) or Hard Disc Drives (HDDs).

Figure 2:
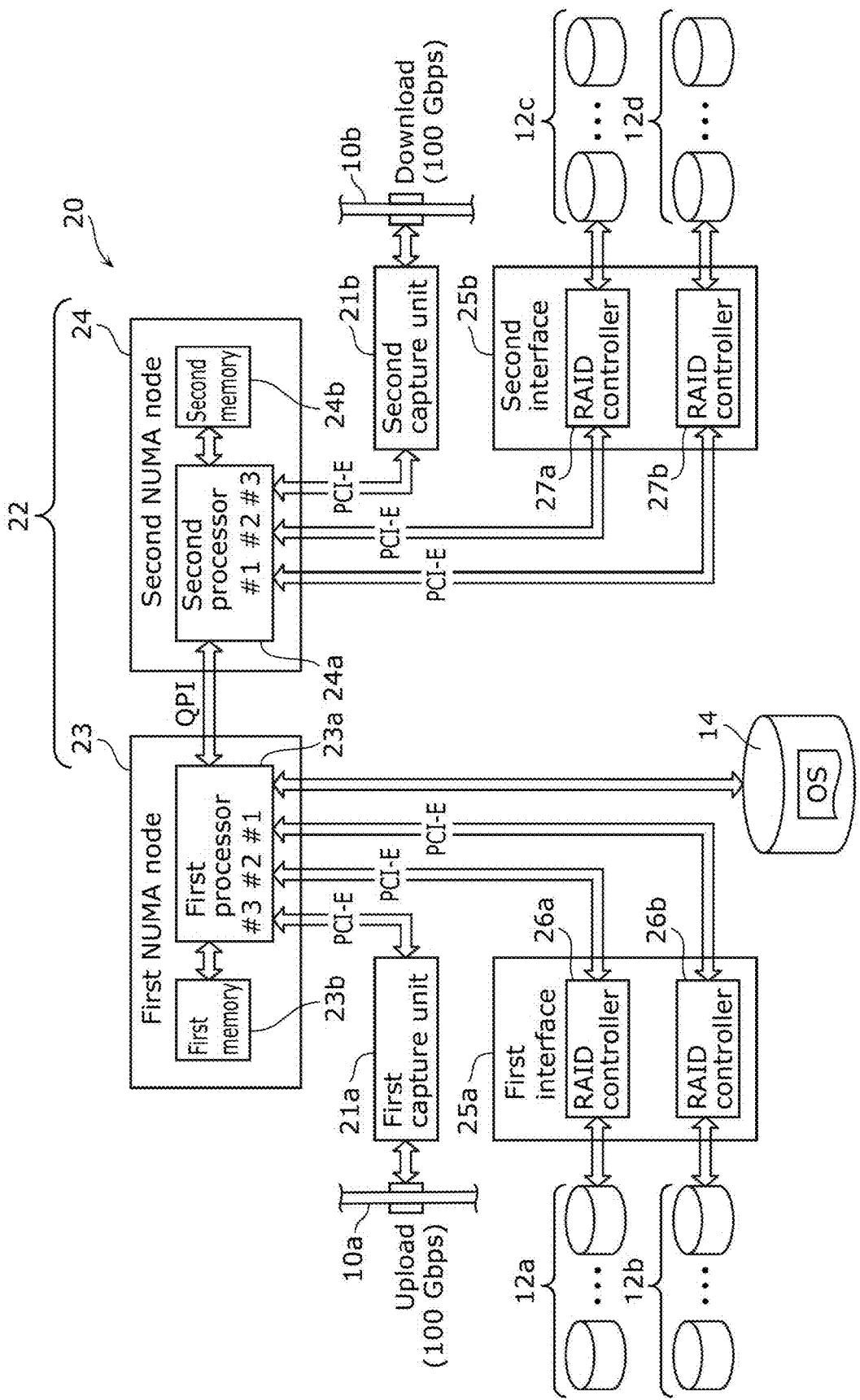
FIG. 2 is a block diagram illustrating a detailed configuration of the packet capture device illustrated in FIG. 1.

FIG. 2 is a block diagram illustrating a detailed configuration of packet capture device 20 illustrated in FIG. 1. It is to be noted that the diagram also illustrates: communication network 10a for upload and communication network 10b for download which make up one communication network 10; a plurality of secondary storage devices 12a to 12d which make up secondary storage device 12; and secondary storage device 14 storing an Operating System (OS).

As illustrated in the diagram, first processor 23a included in first NUMA node 23 and second processor 24a included in second NUMA node 24 are connected by Quick Path Interconnect (QPI).

First processor 23a has three Peripheral Component Interconnect (PCI) slots 1 to 3. First processor 23a is connected to first interface 25a via PCI Express (PCI-E) buses using two PCI slots #1 and #2 among the PCI slots #1 to #3, and is connected to first capture unit 21a via PCI-E bus using the other PCI slot #3.

First memory 23b included in first NUMA node 23 is, for example, a Double-Data-Rate4 Synchronous Dynamic Random Access Memory (DDR4 SDRAM).

First capture unit 21a is a Network Interface Card (NIC) which causes packets of a first type which are upload packets that flow at 100 Gbps in communication network 10a for upload included in communication network 10 to branch off using a network tap, captures the upload packets through detection by a transceiver, and stores the captured packets into first memory 23b.

First interface 25a includes two Redundant Arrays of Inexpensive Disks (RAID) controllers 26a and 26b which operate in parallel. Two RAID controllers 26a and 26b input and output data to and from secondary storage devices 12a and 12b and manage the data therein, respectively.

Secondary storage device 14 stores an Operating System (OS), and is connected to first processor 23a. It is to be noted that the OS includes a program for causing packet capture device 20 to operate. Specifically, the program includes a plurality of first threads which are processed in parallel by first processor 23a, and a plurality of second threads which are processed in parallel by second processor 24a, as described later.

Second processor 24a includes three PCI slots #1 to #3. Second processor 24a is connected to second interface 25b via PCI-E buses using two PCI slots #1 and #2 among the PCI slots #1 to #3, and is connected to second capture unit 21b via PCI-E bus using the other PCI slot #3.

Second memory 24b included in second NUMA node 24 is, for example, a DDR4 SDRAM.

Second capture unit 21b is a NIC which causes packets of a second type which are download packets that flow at 100 Gbps in communication network 10b for download included in communication network 10 to branch off using a network tap, captures the download packets through detection by a transceiver, and stores the captured packets into second memory 24b.

Second interface 25b includes two RAID controllers 27a and 27b which operate in parallel. Two RAID controllers 27a and 27b input and output data to and from secondary storage devices 12c and 12d and manage the data therein, respectively.

Next, a description is given of an operation by packet capture device 20 according to this embodiment configured as described above.

Figure 3:
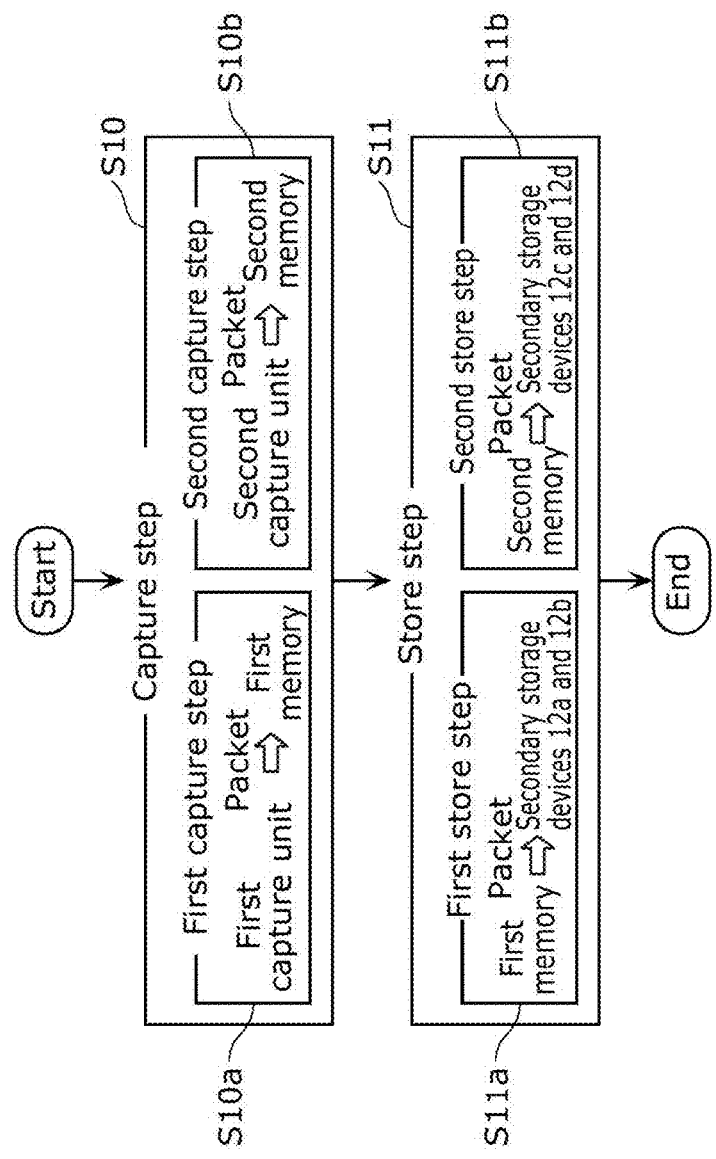
FIG. 3 is a flow chart indicating an operation (a packet capture method) performed by the packet capture device according to the embodiment.

FIG. 3 is a flow chart indicating an operation (that is, a packet capture method) performed by packet capture device 20 according to this embodiment.

Figure 4A:
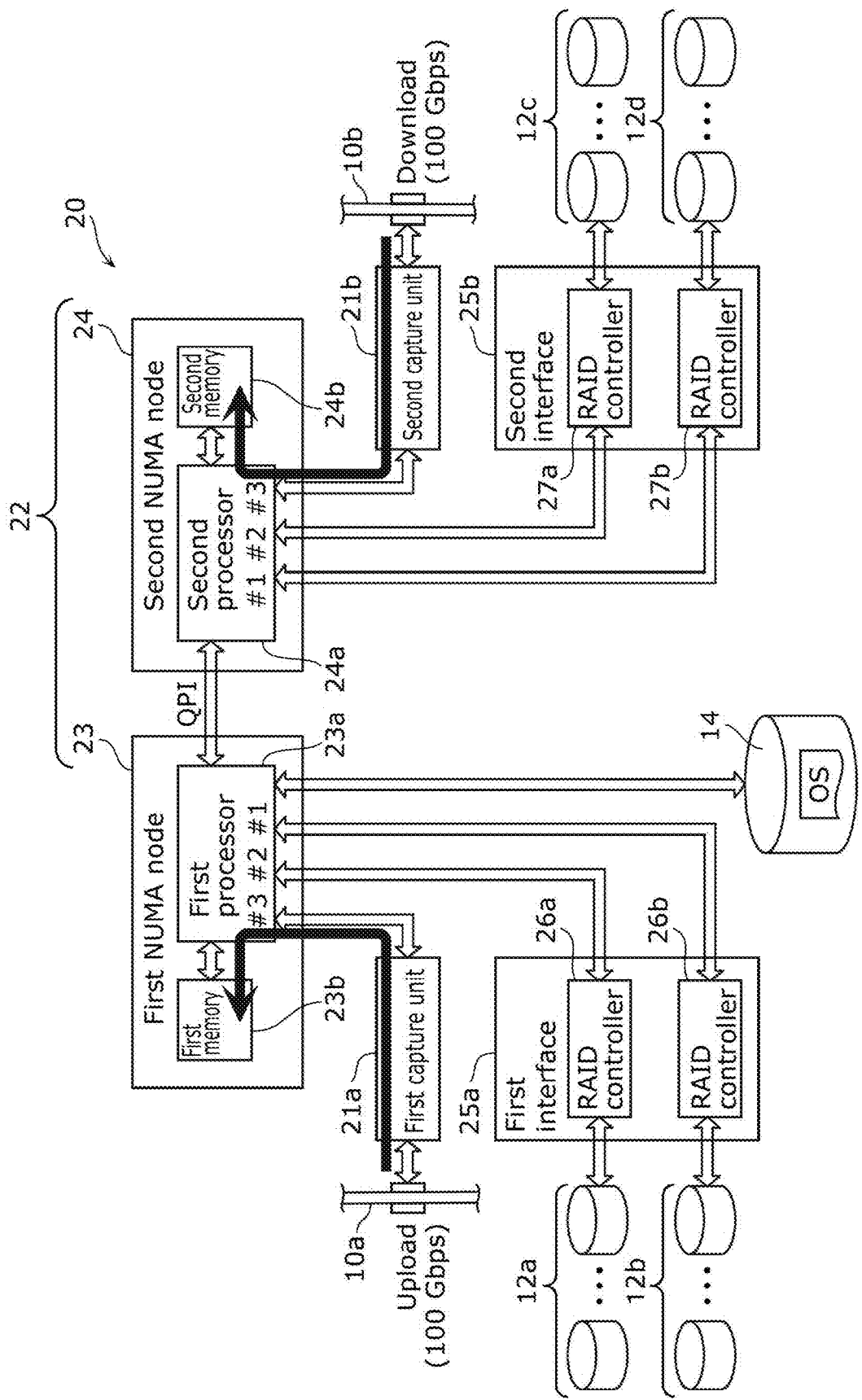
FIG. 4A is a diagram indicating flows of packets in a capture step in FIG. 3.

First, capture unit 21 sequentially captures packets that flow in communication network 10 at 200 Gbps without dropping any of the packets under control of control unit 22 (capture step S10). FIG. 4A is a diagram indicating flows of packets in capture step S10 in FIG. 3. The black bold arrows indicate the flows of the captured packets.

In capture step S10, first capture step S10a and second capture step S10b are performed in parallel. In other words, in first capture step S10a, first capture unit 21a captures packets that flow at 100 Gbps in communication network 10a under control of first NUMA node 23, and stores the captured packets into first memory 23b which is a local memory included in first NUMA node 23. On the other hand, in second capture step S10b, second capture unit 21b captures packets that flow at 100 Gbps in communication network 10b under control of second NUMA node 24, and stores the captured packets into second memory 24b which is a local memory included in second NUMA node 24.

Figure 4B:
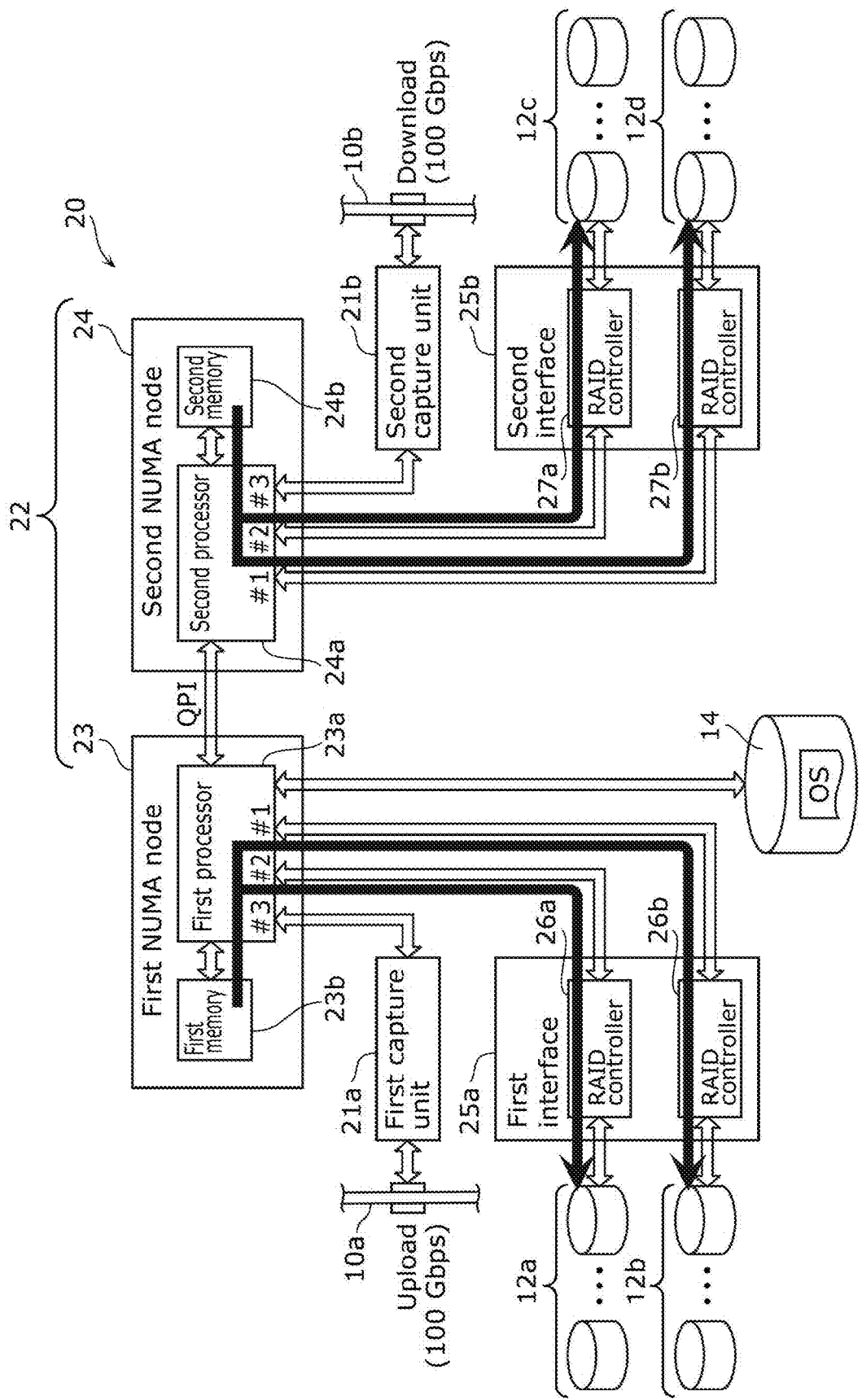
FIG. 4B is a diagram indicating flows of packets in a store step in FIG. 3.

Next, interface 25 stores the packets captured in capture step S10 under control of control unit 22 into second storage device 12 (store step S11 in FIG. 3). FIG. 4B is a diagram indicating flows of packets in store step S11 in FIG. 3. The black bold arrows indicate the flows of the captured packets.

In store step S11, first store step S11a and second store step S11b are performed in parallel. In other words, in first store step S11a, first interface unit 25a stores the packets stored in first memory 23b into secondary storage devices 12a and 12b under control of first NUMA node 23. On the other hand, in second store step S11b, second interface unit 25b stores the packets stored in second memory 24b into secondary storage devices 12c and 12d under control of second NUMA node 24.

Figure 5:
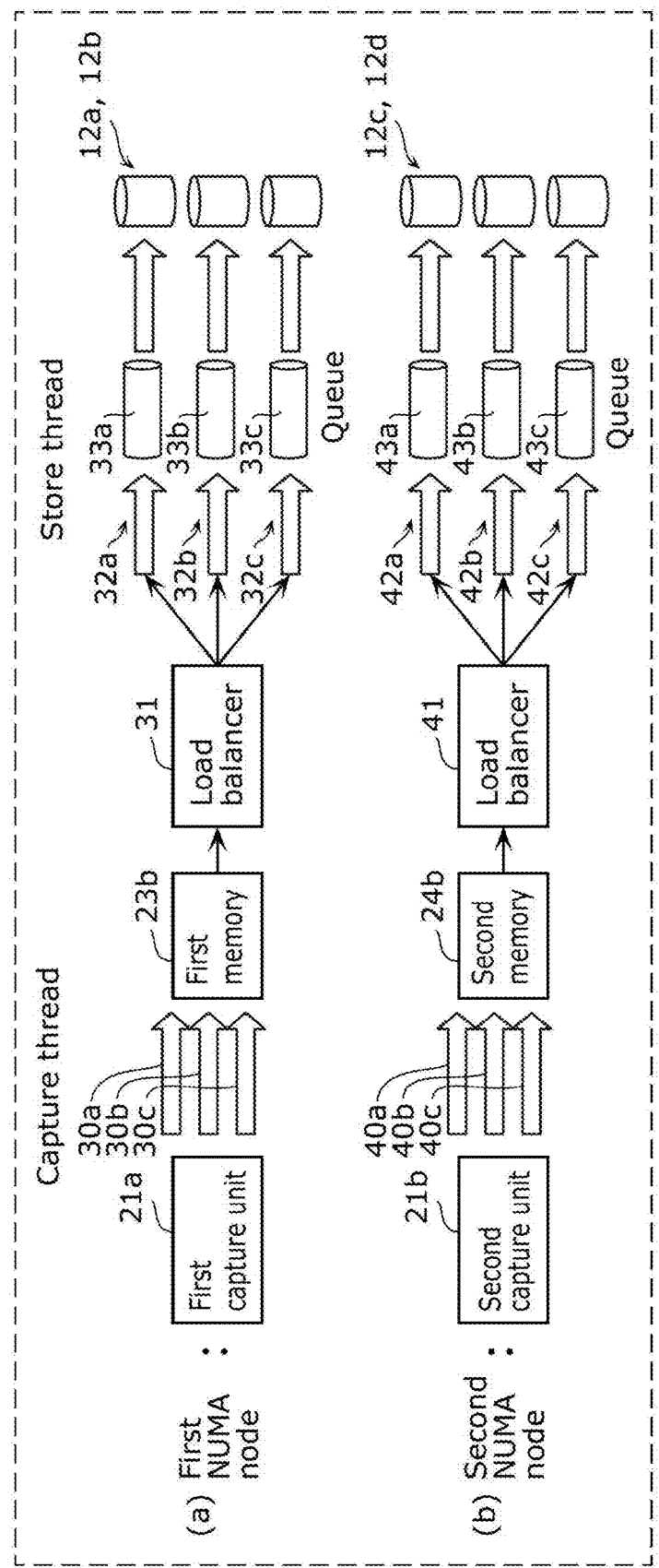
FIG. 5 is a data flow chart indicating a detailed operation (parallel processing by multi threads) performed by the packet capture device according to the embodiment.

FIG. 5 is a data flow chart indicating a detailed operation (parallel processing by multi threads) performed by packet capture device 20 according to the embodiment. Here, FIG. 5 indicates the flows of packets when the captured packets are stored. In FIG. 5, (a) indicates the flow of packets that flow via first NUMA node 23, and (b) indicates the flow of packets that flow via second NUMA node 24.

As illustrated in (a) in FIG. 5, in the flow of the packets that flow via first NUMA node 23, first, the packets captured by first capture unit 21a are stored into first memory 23b by being subjected to parallel transfer by a plurality of threads (capture threads 30a to 30c) executed by first processor 23a. Next, the packets stored in first memory 23b are stored into secondary storage devices 12a and 12b via first interface 25a (not illustrated) by being passed to load balancer 31 and then being subjected to parallel transfer by a plurality of threads (store threads 32a to 32c with ques 33a to 33c) executed by first processor 23a. It is to be noted that capture threads 30a to 30c and store threads 32a to 32c are examples of a plurality of first threads to be processed in parallel by first processor 23a. In addition, the transfer of the packets by the threads is performed in units of a block which is a predetermined amount of data.

Load balancer 31 is a control process of distributing, to store threads 32a to 32c, loads for storing each of the packets stored in first memory 23b into a corresponding one of secondary storage devices 12a and 12b. The process is executed by first processor 23a. It is to be noted that capture threads 30a to 30c, store threads 32a to 32c, and load balancer 31 are software loaded by a program stored in secondary storage device 14 into first memory 23b via first processor 23a and held therein.

As illustrated in (b) in FIG. 5, in the flow of the packets that flow via second NUMA node 24, first, the packets captured by second capture unit 21b are stored into second memory 24b by being subjected to parallel transfer by a plurality of threads (capture threads 40a to 40c) executed by second processor 24a. Next, the packets stored in second memory 24b are stored into secondary storage devices 12c and 12d via second interface 25b (not illustrated) by being passed to load balancer 41 and then being subjected to parallel transfer by a plurality of threads (store threads 42a to 42c with ques 43a to 43c) executed by second processor 24a. It is to be noted that capture threads 40a to 40c and store threads 42a to 42c are examples of a plurality of second threads to be processed in parallel by second processor 24a. In addition, the transfer of the packets by the threads is performed in units of a block which is a predetermined amount of data.

Load balancer 41 is a control process of distributing, to store threads 42a to 42c, loads for storing each of the packets stored in second memory 24b into a corresponding one of secondary storage devices 12c and 12d. The process is executed by second processor 24a. It is to be noted that capture threads 40a to 40c, store threads 42a to 42c, and load balancer 41 are software loaded by a program stored in secondary storage device 14 into second memory 24b via first processor 23a and second processor 24a and held therein.

In this way, in packet capture device 20 according to this embodiment, the flow of the packets via first NUMA node 23 and the flow of the packets via second NUMA node 24 are completely divided and performed in parallel. This achieves high-speed packet capturing by packet capture device 20.

We have performed an experiment in which packets that flow over Ethernet (registered trademark) at 200 Gbps are sequentially captured using packet capture device 20 according to this embodiment. Next, the experiment is described below.

Figure 6:
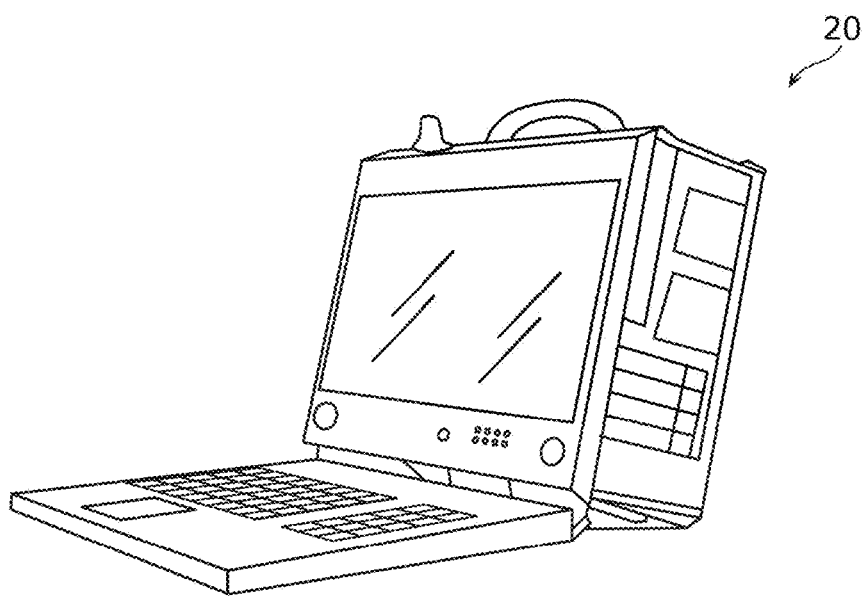
FIG. 6 is an appearance of the packet capture device according to the embodiment used in an experiment.

FIG. 6 is an appearance of packet capture device 20 according to this embodiment used in the experiment. Packet capture device 20 is configured as a portable system integrated to include a user interface having a keyboard, a display, etc. and a secondary storage device. The principal hardware configuration is indicated below.

Each of first processor 23a and second processor 24a is Model Xeon E5-2637 v3 (the base operation frequency is 3.5 GHz, the number of cores is four, and the number of threads is eight) of Intel Corporation.

Each of first memory 23b and second memory 24b is configured to include eight 8 GB Dual Inline Memory Modules (DIMs) (the speed corresponds to DDR4-2133, and the total memory size is 64 GB).

Each of first capture unit 21a and second capture unit 21b is Model NT200A01-2x100 of Napatech Corporation.

Each of first interface 25a and second interface 25b is configured to include two Model ASR-81605ZQ RAID cards of Microsemi Adaptec Corporation.

Secondary storage device 12 (secondary storage devices 12a to 12d) is configured to include thirty-two Model Nytro3530 of Seagate Corporation (the capacity is 3.2 TB, and the type is SAS SSD).

Figure 7A:
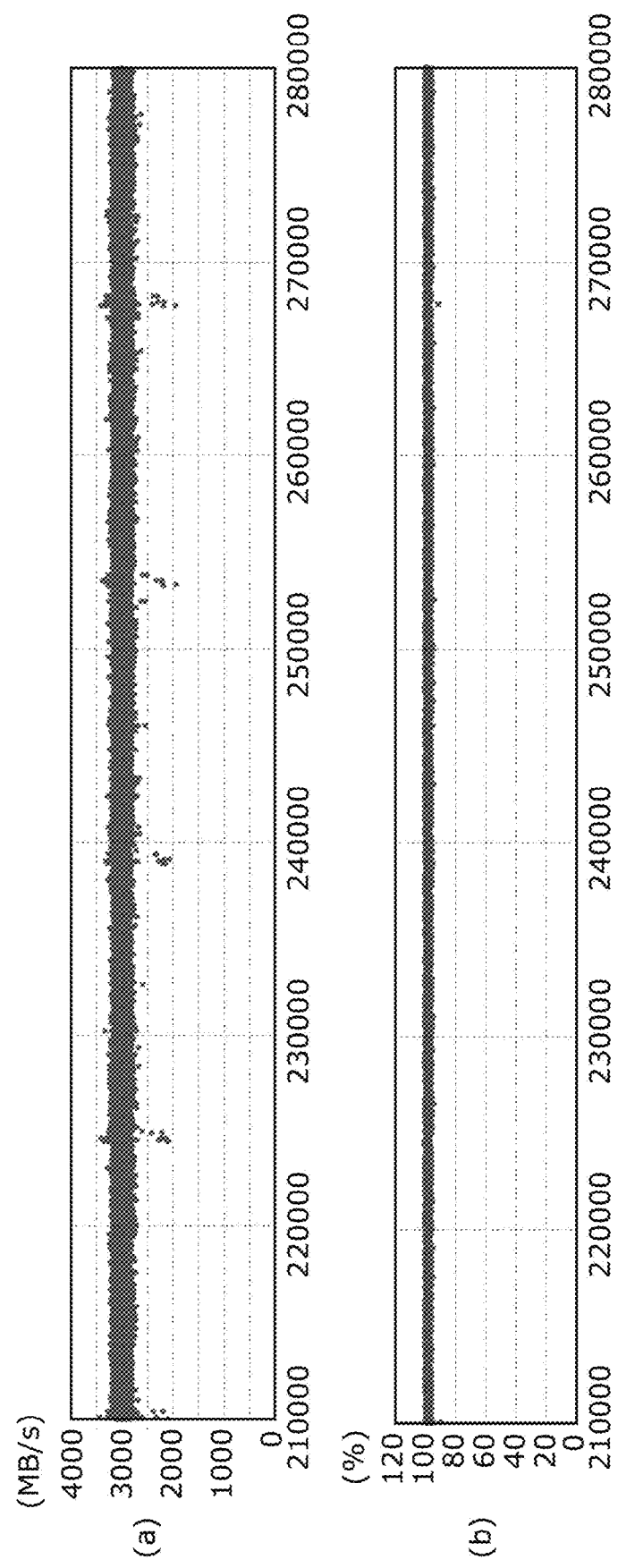
FIG. 7A is a diagram indicating the result of the experiment obtained by the packet capture device illustrated in FIG. 5.
Figure 7B:
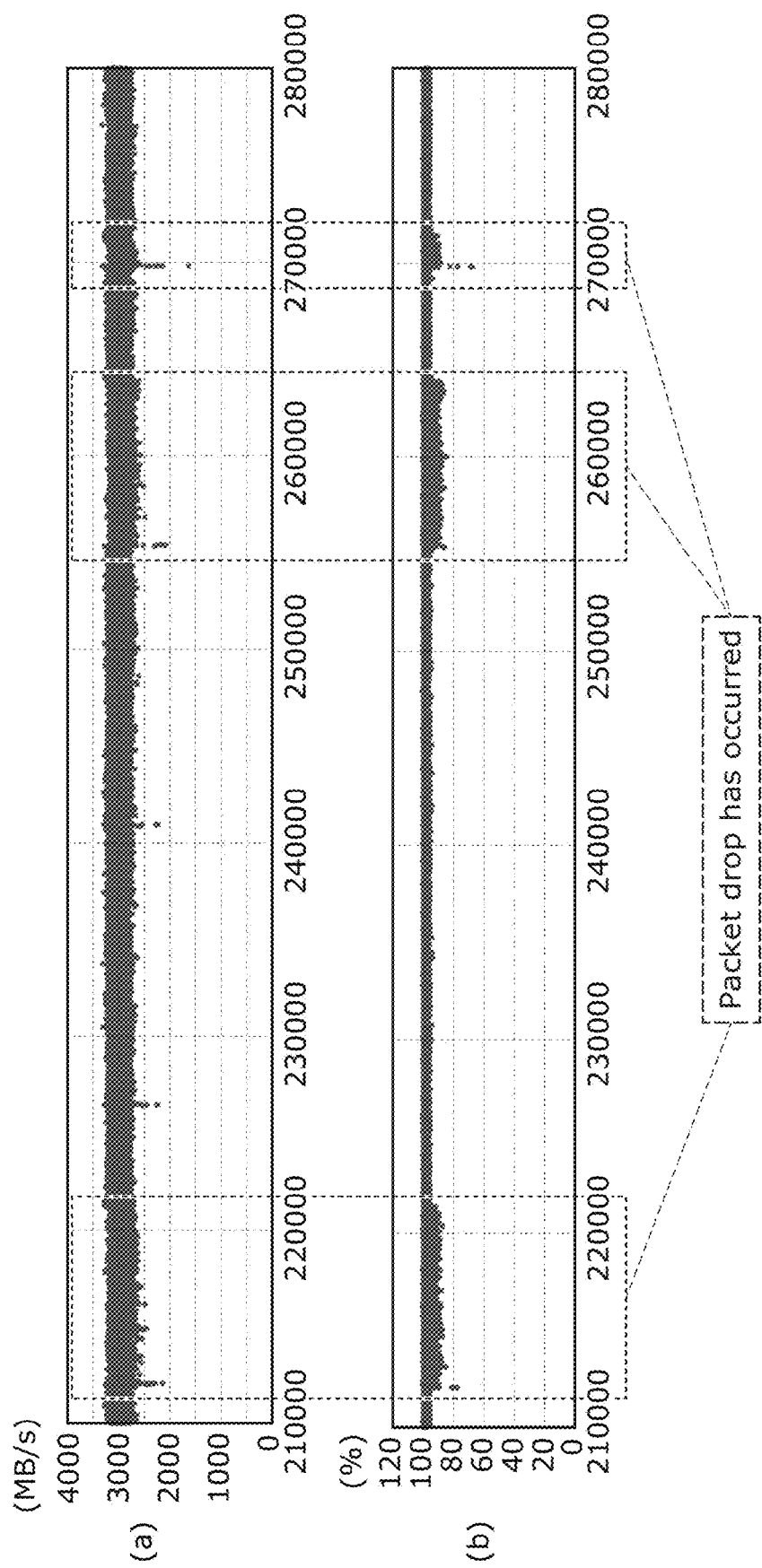
FIG. 7B is a diagram indicating the result of an experiment obtained by a packet capture device according to a comparison example.

FIG. 7A is a diagram indicating the result of the experiment obtained by packet capture device 20 illustrated in FIG. 5. FIG. 7B is a diagram indicating the result of an experiment obtained by a packet capture device according to a comparison example. The packet capture device according to the comparison example is a packet capture device which does not have a NUMA architecture (in other words, a packet capture device which has a UMA architecture).

In each of FIGS. 7A and 7B, the horizontal axis indicates time (second). Each of the vertical axis in (a) in FIG. 7A and the vertical axis in (a) in FIG. 7B indicates the write speed (MB/s) into secondary storage device 12 (that is specifically one of eight secondary storage devices (the one is secondary storage device 12a, or the like)), and each of the vertical axis in (b) in FIG. 7A and the vertical axis in (b) in FIG. 7B indicates the rate (%) of time during which input and output to and from secondary storage device 12 is performed. In FIGS. 7A and 7B, measured values obtained by performing sampling repeatedly are plotted.

In FIG. 7B according to the comparison example, a phenomenon is seen at each of points with indication of "packet drop has occurred"; the phenomenon is that the write speed is intermittently and continuously decreases ((a) in FIG. 7B) and the rate of time during which input and output are performed decreases ((b) in FIG. 7B). Since the write speed and the rate of time during which input and output are performed have decreased at the same time, it is known that sufficient amount of data itself to be written into the secondary storage device have not reached rather than that intermittent write performance into the secondary storage device has decreased. In other words, the write speed has decreased due to a path to the secondary storage device. More specifically, a packet drop has occurred at an interval of 1 to 2 hours. In other words, it is known that the packet capture device according to the comparison example was not able to sequentially store packets that flown at 200 Gbps into the secondary storage device without dropping any of the packets.

On the other hand, in FIG. 7A according to this embodiment, neither significant decrease in write speed ((a) in FIG. 7A) nor significant decrease in input and output time ((b) in FIG. 7A) have been observed. More specifically, packets have been captured sequentially over forty-eight hours without any packet drop. In other words, it is known that packet capture device 20 according to this embodiment was able to sequentially store packets that flown at 200 Gbps into the secondary storage device without dropping any of the packets. It is considered that this result is obtained because packet capture device 20 according to this embodiment has the NUMA architecture configured to include the two NUMA nodes which perform data transfer independently and in parallel, unlike the packet capture device according to the comparison example. In other words, packet capture device 20 according to this embodiment explicitly specifies, for each of the NUMA nodes, the secondary storage device which belongs to the CPU in the NUMA node, and performs, for each of the NUMA nodes, the processes up to the process of parallel writing independently. In this way, the captured packets are stored into the secondary storage device 12 through parallel processing by the multi-processors without QPI which would be a bottleneck in data transfer.

As described above, packet capture device 20 according to this embodiment is a device which captures packets that flow in communication network 10 and stores the packets into secondary storage device 12. Packet capture device 20 includes: capture unit 21 which sequentially captures packets that flow in communication network 10 at 200 Gbps without dropping any of the packets; control unit 22 which temporarily holds the packets captured by capture unit 21; and interface 25 which stores the packets temporarily held in control unit 22 into secondary storage device 12. Controller 22 includes two NUMA nodes which are first NUMA node 23 and second NUMA node 24. First NUMA node 23 includes first processor 23a and first memory 23b, and second NUMA node 24 includes second processor 24a and second memory 24b. Capture unit 21 includes first capture unit 21a and second capture unit 21b. First capture unit 21a is connected to first NUMA node 23, captures packets that flow in communication network 10, and stores the captured packets into first memory 23b. Second capture unit 21b is connected to second NUMA node 24, captures packets that flow in communication network 10 in parallel with the capturing by first capture unit 21a, and stores the captured packets into second memory 24b. Interface 25 includes first interface 25a and second interface 25b. First interface 25a is connected to first NUMA node 23, and stores the packets stored in first memory 23b into secondary storage device 12. Second interface 25b is connected to second NUMA node 24, and stores the packets stored in second memory 24b into secondary storage device 12 in parallel with the writing by first interface unit 25a.

In this way, with the NUMA architecture, the packet capture and storing of the packets into secondary storage device 12 by first NUMA node 23 and the packet capture and storing of the packets into secondary storage device 12 by second NUMA node 24 are performed by the respective NUMA nodes in parallel and independently. Thus, all the packets that flow in communication network 10 at 200 Gbps are sequentially captured without being dropped and stored into secondary storage device 12.

Here, first capture unit 21a captures packets of a first type that flow in communication network 10 at 100 Gbps, and stores the captured packets into first memory 23b; and second capture unit 21b captures packets of a second type that flow in communication network 10 at 100 Gbps, and stores the captured packets into second memory 24b in parallel with the capturing by first capture unit 21a. In this way, the load for the capturing of the packets that flow in communication network 10 at 200 Gbps is evenly distributed to the two NUMA nodes, and the packet capturing is sequentially performed without dropping any of the packets.

In addition, the packets of the first type are upload packets in communication network 10, and the packets of the second type are download packets in communication network 10. In this way, the packets that flow in communication network 10 at 200 Gbps are divided into the upload packets and the download packets, and the load for the capturing of the packets is distributed to the two NUMA nodes.

Furthermore, first memory 23b holds a plurality of first threads which are processed in parallel by first processor 23a. The plurality of first threads include: two or more capture threads 30a to 30c for storing the packets sequentially captured by first capture unit 21a into first memory 23b; and two or more store threads 32a to 32c for storing the packets stored in first memory 23b into secondary storage device 12 via first interface 25a. Second memory 24b holds a plurality of second threads which are processed in parallel by second processor 24a. The plurality of second threads includes: two or more capture threads 40a to 40c for storing the packets sequentially captured by second capture unit 21b into second memory 24b; and two or more store threads 42a to 42c for storing the packets stored in second memory 24b into secondary storage device 12 via second interface 25b.

In this way: by the multi-threads executed by first processor 23a, the packets sequentially captured by first capture unit 21a without being dropped are stored into secondary storage device 12; and in parallel with this, by the multi-threads executed by second processor 24a, the packets sequentially captured by second capture unit 21b without being dropped are stored into secondary storage device 12.

Furthermore, a packet capture method according to this embodiment is a method for capturing packets that flow in communication network 10 and storing the captured packets into secondary storage device 12. The packet capture method includes: capture step S10 of sequentially capturing packets that flow in communication network 10 at 200 Gbps without dropping any of the packets; and store step S11 of storing the packets captured in capture step S10 into secondary storage device 12. Capture step S10 includes: first capture step S10a of capturing the packets that flow in communication network 10, and storing the captured packet into first memory 23b included in first NUMA node 23 included in the NUMA architecture; and a second capture step S10b of capturing the packets that flow in communication network 10 in parallel with the capturing in first capture step S10a, and storing the captured packet into second memory 24b included in second NUMA node 24 included in the NUMA architecture. Store step S11 includes: first store step S11a of storing the packets stored in first memory 23b into secondary storage device 12; and second store step S11b of storing the packets stored in second memory 24b into secondary storage device 12 in parallel with the storing in first store step S11a.

In this way, with the NUMA architecture, the packet capturing and storing of the packets into secondary storage device 12 by first NUMA node 23 and the packet capturing and storing of the packets into secondary storage device 12 by second NUMA node 24 are performed by the respective NUMA nodes in parallel and independently. Thus, all the packets that flow in communication network 10 at 200 Gbps are sequentially captured without being dropped and stored into secondary storage device 12.

Although the packet capture device and the packet capture method according to the present invention have been described above, the present invention is not limited to the above-described embodiment. The present disclosure covers and encompasses embodiments that a person skilled in the art may arrive at by adding various kinds of modifications to the above embodiment or by arbitrarily combining some of the constituent elements in the embodiment within the scope of the present disclosure.

INDUSTRIAL APPLICABILITY

The present invention is applicable as a packet capture device capable of capturing packets that flow in a communication network, and storing the captured packets into a secondary storage device, and in particular as a packet device capable of capturing all packets that flow in a communication network for a long period of time in preparation for response to communication errors in Ethernet (registered trademark) at 200 Gbps.

Packet capture device 20 according to the above-described embodiment includes the two NUMA nodes. However, for example, packet capture device 20 may include three or more NUMA nodes, and may capture all packets that flow in a communication network at a communication speed that exceeds 200 Gbps for a long period of time. For example, when a capture unit corresponding to one NUMA node, the NUMA node, and an interface are included in one system, packet capture device 20 may include three or more such systems.

Packet capture device 20 according to the above-described embodiment includes the RAID controllers as interface 25 for input and output to and from secondary storage device 12. However, controllers are not limited to such type controllers, and for example, packet capture device 20 may include non-RAID controllers.

In packet capture device 20 according to the above-described embodiment, the load for the capturing of upload packets and the load for the capturing of download packets are distributed to the two NUMA nodes. However, load distribution is not limited to such load distribution. For example, packets captured by a single capture card capable of capturing packets at 200 Gbps and temporarily held may be distributed, in units of a block, to two NUMA nodes on storage paths to secondary storage device 12 for storage.

Furthermore, the present invention can be implemented not only as packet capture device 20 and a packet capture method, but also as a program (that includes threads and processes) which function as packet capture device 20 and as a computer-readable recording medium on which the program is recorded.

REFERENCE SIGNS LIST 10, 10a, 10b communication network
12, 12a to 12d, 14 secondary storage device
20 packet capture device
21 capture unit
21a first capture unit
21b second capture unit
22 control unit
23 first NUMA node
23a first processor
23b first memory
24 second NUMA node
24a second processor
24b second memory
25 interface
25a first interface
25b second interface
26a, 26b, 27a, 27b RAID controller
30a to 30c, 40a to 40c capture thread
31, 41 load balancer
32a to 32c, 42a to 42c store thread
33a to 33c, 43a to 43c que

The invention claimed is:

1. A packet capture device which captures packets that flow in a communication network, and stores the packets captured into a secondary storage device, the packet capture device comprising:
   a capture unit which sequentially captures packets that flow in the communication network at 200 Gbps without dropping any of the packets;
   a control unit which temporarily holds the packets captured by the capture unit; and
   an interface which stores the packets temporarily held in the control unit into the secondary storage device,
   wherein the control unit includes: two Non-Uniform Memory Access (NUMA) nodes included in a NUMA architecture; and a communication path which connects a first processor and a second processor, the two NUMA nodes being a first NUMA node including the first processor and a first memory and a second NUMA node including the second processor and a second memory,
   the capture unit includes:
   a first capture unit which is connected to the first NUMA node, captures packets that flow in the communication network, and stores the packets captured into the first memory; and
   a second capture unit which is connected to the second NUMA node, captures packets that flow in the communication network in parallel with the capturing by the first capture unit, and stores the packets captured into the second memory,
   the interface includes:
   a first interface which is connected to the first NUMA node, and stores the packets stored in the first memory into the secondary storage device; and
   a second interface which is connected to the second NUMA node, and stores the packets stored in the second memory into the secondary storage device in parallel with the storing by the first interface, and
   first processing and second processing are performed in parallel, the first processing being processing in which the packets captured by the first capture unit are stored into the first memory included in the first NUMA node without passing through the communication path, and then stored into the secondary storage device via the first interface connected to the first NUMA node and the second processing being processing in which the packets captured by the second capture unit are stored into the second memory included in the second NUMA node without passing through the communication path, and then stored, into the secondary storage device via the second interface connected to the second NUMA node.

2. The packet capture device according to claim 1, wherein the first capture unit captures, among the packets, packets of a first type that flow in the communication network at 100 Gbps, and stores the packets captured into the first memory, and
   the second capture unit captures, among the packets, packets of a second type that flow in the communication network at 100 Gbps in parallel with the capturing by the first capture unit, and stores the packets captured into the second memory.

3. The packet capture device according to claim 2, wherein the packets of the first type are upload packets in the communication network, and
   the packets of the second type are download packets in the communication network.

4. The packet capture device according to claim 1, wherein the first memory holds a plurality of first threads which are processed in parallel by the first processor,
   the plurality of first threads include:
   two or more threads for storing the packets captured by the first capture unit into the first memory; and
   two or more threads for storing the packets stored in the first memory into the secondary storage device via the first interface,
   the second memory holds a plurality of second threads which are processed in parallel by the second processor, and
   the plurality of second threads includes:
   two or more threads for storing the packets captured by the second capture unit into the second memory; and
   two or more threads for storing the packets stored in the second memory into the secondary storage device via the second interface.

5. A packet capture method for capturing packets that flow in a communication network, and storing the packets captured into a secondary storage device, the packet capture method, comprising:
   a capture step of sequentially capturing packets that flow in the communication network at 200 Gbps without dropping any of the packets; and
   a store step of storing the packets captured in the capture step into the secondary storage device,
   wherein the capture step includes:
   a first capture step of capturing packets that flow in the communication network, and storing the packets captured into a first memory included in a first Non-Uniform Memory Access (NUMA) node included in a NUMA architecture; and
   a second capture step of capturing the packets that flow in the communication network in parallel with the capturing in the first capture step, and storing the packets captured into a second memory included in a second NUMA node included in the NUMA architecture,
   the store step includes:
   a first store step of storing the packets stored in the first memory into the secondary storage device; and
   a second store step of storing the packets stored in the second memory into the secondary storage device in parallel with the storing in the first storing step, and
   in the first capture step, the second capture step, the first store step, and the second store step, the packets do not pass through a communication path which connects a first processor included in the first NUMA node and a second processor included in the second NUMA node.

* * * * *